(12) United States Patent
Batchelder et al.

(10) Patent No.: US 11,993,006 B2
(45) Date of Patent: May 28, 2024

(54) SELECTIVE DEPOSITION-BASED ADDITIVE MANUFACTURING DEVICE AND METHOD OF PRINTING 3D PARTS WITH SEMI-CRYSTALLINE MATERIALS

(71) Applicant: Evolve Additive Solutions, Inc., Minnetonka, MN (US)

(72) Inventors: J. Samuel Batchelder, Somers, NY (US); Eric Carl Stelter, Lexington, KY (US)

(73) Assignee: Evolve Additive Solutions, Inc, Minnetonka, MN (US)

( * ) Notice: Subject to any disclaimer, the term of this patent is extended or adjusted under 35 U.S.C. 154(b) by 359 days.

(21) Appl. No.: 17/615,366

(22) PCT Filed: May 29, 2020

(86) PCT No.: PCT/US2020/035253
§ 371 (c)(1),
(2) Date: Nov. 30, 2021

(87) PCT Pub. No.: WO2020/243522
PCT Pub. Date: Dec. 3, 2020

(65) Prior Publication Data
US 2022/0227040 A1 Jul. 21, 2022

Related U.S. Application Data

(60) Provisional application No. 62/855,566, filed on May 31, 2019.

(51) Int. Cl.
*B33Y 10/00* (2015.01)
*B29C 64/147* (2017.01)
(Continued)

(52) U.S. Cl.
CPC .......... *B29C 64/147* (2017.08); *B29C 64/218* (2017.08); *B29C 64/295* (2017.08);
(Continued)

(58) Field of Classification Search
CPC .............................. B33Y 10/00; B33Y 30/00
See application file for complete search history.

(56) References Cited

U.S. PATENT DOCUMENTS 8,123,999 B2  2/2012  Priedeman et al.
8,246,888 B2  8/2012  Hopkins et al.
(Continued)

FOREIGN PATENT DOCUMENTS

CN  108527839  9/2018
WO  2017058197  4/2017
(Continued)

OTHER PUBLICATIONS

"Extended European Search Report," for European Patent Application No. 20814937.7 dated Jan. 4, 2023 (8 pages).
(Continued)

*Primary Examiner* — Jeffry H Aftergut
(74) *Attorney, Agent, or Firm* — Pauly, DeVries Smith & Deffner LLC

(57) ABSTRACT

A selective deposition-based additive manufacturing system capable of building a three-dimensional (3D) part utilizing a semi-crystalline polymeric material includes at least one electrostatographic engine configured to develop one or more layers of particles of semi-crystalline polymeric material corresponding to one or more slices of a 3D model of a 3D part. The system includes a transfer medium configured to receive the one or more layers of particles of the semi-crystalline polymeric material on a front side from the at least one electrostatographic engine and to move the one or more layers away from the electrostatographic engine and a
(Continued)

platen configured to carry the 3D part or support being printed. The system includes a gantry coupled to the platen and configured to move the platen into registration with the one or more layers, and a heater configured to heat a top surface of the 3D part being printed to a transfuse temperature. The system includes a layer transfer assembly having a roller contacting a back side of the transfer medium and a driver configured to cause the layer to transfer from the front side of the transfer medium to the heated top surface of the part. The system includes a cooler configured to cool the heated semi-crystalline polymeric material at a maximum rate of at least 20° C. per second such that the semi-crystalline material is in a super-cooled state wherein the semi-crystalline polymeric material does not completely initially crystallize.

16 Claims, 5 Drawing Sheets

(51) Int. Cl.
*B29C 64/218* (2017.01)
*B29C 64/295* (2017.01)
*B29C 64/321* (2017.01)
*B33Y 30/00* (2015.01)
*B33Y 40/20* (2020.01)
*B33Y 70/00* (2020.01)

(52) U.S. Cl.
CPC ............. *B29C 64/321* (2017.08); *B33Y 10/00* (2014.12); *B33Y 30/00* (2014.12); *B33Y 40/20* (2020.01); *B33Y 70/00* (2014.12)

(56) References Cited

U.S. PATENT DOCUMENTS

| | | | |
|---|---|---|---|
| 8,459,280 | B2 | 6/2013 | Swanson et al. |
| 8,488,994 | B2 | 7/2013 | Hanson et al. |
| 8,765,045 | B2 | 7/2014 | Zinniel |
| 8,879,957 | B2 | 11/2014 | Hanson et al. |
| 2011/0186081 | A1 | 8/2011 | Dunn et al. |
| 2013/0186549 | A1 | 7/2013 | Comb et al. |
| 2013/0186558 | A1 | 7/2013 | Comb et al. |
| 2015/0145168 | A1 | 5/2015 | Rodgers et al. |
| 2015/0251353 | A1 | 9/2015 | Rodgers et al. |
| 2017/0192377 | A1 | 7/2017 | Batchelder et al. |

FOREIGN PATENT DOCUMENTS

| | | | |
|---|---|---|---|
| WO | WO-2017/108477 A1 * | 6/2017 | |
| WO | 2019000966 | 1/2019 | |
| WO | 2019028030 | 2/2019 | |
| WO | WO-2019/028030 A1 * | 2/2019 | |
| WO | 2020243522 | 12/2020 | |

OTHER PUBLICATIONS

"Response to Communication Pursuant to Rules 161(1) and 162 EPC," for European Patent Application No. 20814937.7 filed Jun. 28, 2022 (7 pages).
"Response to Communication Pursuant to Rules 70(2) and 70a(2)," for European Patent Application No. 20814937.7 filed Jul. 20, 2023 (44 pages).
"International Preliminary Report on Patentability," for PCT Application No. PCT/US2020/035253 dated Dec. 9, 2021 (8 pages).
"International Search Report and Written Opinion," for PCT Application No. PCT/US2020/035253 dated Sep. 17, 2020 (13 pages).

* cited by examiner

SELECTIVE DEPOSITION-BASED ADDITIVE MANUFACTURING DEVICE AND METHOD OF PRINTING 3D PARTS WITH SEMI-CRYSTALLINE MATERIALS

This application is being filed as a PCT International Patent application on May 29, 2020 in the name of Evolve Additive Solutions, Inc., a U.S. national corporation, applicant for the designation of all countries, and J. Samuel Batchelder, a U.S. Citizen, inventor for the designation of all countries, and Eric Carl Stelter, a U.S. Citizen, inventor and applicant for the designation of all countries, and claims priority to U.S. Provisional Patent Application No. 62/855,566, filed May 31, 2019, the contents of which are herein incorporated by reference in its entirety.

BACKGROUND

The present disclosure relates to additive manufacturing systems and methods for producing three-dimensional (3D) parts with semi-crystalline materials. In particular, the present disclosure relates to selective deposition-based additive manufacturing systems for producing 3D parts with semi-crystalline polymers, and methods of producing 3D parts with feedstock materials having a semi-crystalline polymeric matrix using the selective deposition-based additive manufacturing systems.

Additive manufacturing is generally a process for manufacturing a three-dimensional (3D) object in additive manner utilizing a computer model of the objects The basic operation of an additive manufacturing system consists of slicing a three-dimensional computer model into thin cross sections, translating the result into position data, and the position data to control equipment which manufacture a three-dimensional structure in a layerwise manner using one or more additive manufacturing techniques. Additive manufacturing entails many different approaches to the method of fabrication, including fused deposition modeling, ink jetting, selective laser sintering, powder/binder jetting, electron-beam melting, electrophotographic imaging, and stereolithographic processes.

In fabricating 3D parts by depositing layers of a part material, supporting layers or structures are typically built underneath overhanging portions or in cavities of objects under construction, which are not supported by the part material itself. A support structure may be built utilizing the same deposition techniques by which the part material is deposited. The host computer generates additional geometry acting as a support structure for the overhanging or free-space segments of the 3D part being formed, and in some cases, for the sidewalls of the 3D part being formed. The support material adheres to the part material during fabrication, and is removable from the completed 3D part when the printing process is complete.

In an electrostatographic 3D printing process, slices of the digital representation of the 3D part and its support structure are printed or developed using an electrophotographic engine. The electrostatographic engine generally operates in accordance with 2D electrophotographic printing processes, using charged powder materials that are formulated for use in building a 3D part (e.g., a polymeric toner material). The electrostatographic engine typically uses a support drum that is coated with a photoconductive material layer, where latent electrostatic images are formed by electrostatic charging following image-wise exposure of the photoconductive layer by an optical source. The latent electrostatic images are then moved to a developing station where the polymeric toner is applied to charged areas, or alternatively to discharged areas of the photoconductive insulator to form the layer of the charged powder material representing a slice of the 3D part. The developed layer is transferred to a transfer medium, from which the layer is transfused to previously printed layers with heat and pressure to build the 3D part.

In addition to the aforementioned commercially available additive manufacturing techniques, a novel additive manufacturing technique has emerged, where particles are first selectively deposited in an imaging process, forming a layer corresponding to a slice of the part to be made; the layers are then bonded to each other, forming a part. This is a selective deposition process, in contrast to, for example, selective sintering, where the imaging and part formation happens simultaneously. The imaging step in a selective deposition process can be done using electrophotography. In two-dimensional (2D) printing, electrophotography (i.e., xerography) is a popular technology for creating 2D images on planar substrates, such as printing paper. Electrophotography systems include a conductive support drum coated with a photoconductive material layer, where latent electrostatic images are formed by charging and then image-wise exposing the photoconductive layer by an optical source. The latent electrostatic images are then moved to a developing station where toner is applied to charged areas of the photoconductive insulator to form visible images. The formed toner images are then transferred to substrates (e.g., printing paper) and affixed to the substrates with heat or pressure.

SUMMARY

In one aspect, the present disclosure is directed to a selective deposition-based additive manufacturing system capable of building a three-dimensional (3D) part utilizing a semi-crystalline polymeric material. The system includes at least one electrostatographic engine configured to develop one or more layers of particles of semi-crystalline polymeric material corresponding to one or more slices of a 3D model of a 3D part. The system includes a transfer medium configured to receive the one or more layers of particles of the semi-crystalline polymeric material on a front side from the at least one electrostatographic engine and to move the one or more layers away from the electrostatographic engine and a platen configured to carry the 3D part or support being printed. The system includes a gantry coupled to the platen and configured to move the platen into registration with the one or more layers, and a heater configured to heat a top surface of the 3D part being printed to a transfuse temperature. The system includes a layer transfer assembly having a roller contacting a back side of the transfer medium and a driver configured to cause the layer to transfer from the front side of the transfer medium to the heated top surface of the part. The system includes a cooler configured to cool the melted semi-crystalline polymeric material at a maximum rate of at least 20° C. per second such that the semi-crystalline material is in a super-cooled state wherein the semi-crystalline polymeric material does not completely initially crystallize.

Another aspect includes a method of printing a 3D part in a layer-wise manner with a semi-crystalline polymeric material utilizing a selective deposition-based additive manufacturing system. The method includes developing a first partial layer of semi-crystalline polymeric material using at least one electrostatotographic engine and conveying the first layer from the at least one electrostatographic engine to a transfusion assembly with a transfer medium. The method includes moving a platen carrying a 3D part being printed with a gantry to a location upstream from the transfusion assembly and heating a top layer of the 3D part to a transfusion temperature. The method includes registering the layer with the 3D part and moving the 3D part and the layer through a transfusion assemble to thermally transfer the layer to the top surface of the 3D part while applying a pressure to a back surface of the transfer medium with a roller. The method includes cooling the transfused layer at a rate of least 20° C. per second such that the semi-crystalline material is super-cooled and repeating the above steps until the 3D part is printed.

The present summary is provided only by way of example, and not limitation. Other aspects of the present invention will be appreciated in view of the entirety of the present disclosure, including the entire text, claims and accompanying figures.

DEFINITIONS

Unless otherwise specified, the following terms as used herein have the meanings provided below:

The term "copolymer" refers to a polymer having two or more monomer species, and includes terpolymers (i.e., copolymers having three monomer species).

The terms "at least one" and "one or more of" an element are used interchangeably, and have the same meaning that includes a single element and a plurality of the elements, and may also be represented by the suffix "(s)" at the end of the element. For example, "at least one polyamide", "one or more polyamides", and "polyamide(s)" may be used interchangeably and have the same meaning.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the present disclosure.

Directional orientations such as "above", "below", "top", "bottom", and the like are made with reference to a direction along a printing axis of a 3D part. In the embodiments in which the printing axis is a vertical z-axis, the layer-printing direction is the upward direction along the vertical z-axis. In these embodiments, the terms "above", "below", "top", "bottom", and the like are based on the vertical z-axis. However, in embodiments in which the layers of 3D parts are printed along a different axis, the terms "above", "below", "top", "bottom", and the like are relative to the given axis.

The term "providing", such as for "providing a material" and the like, when recited in the claims, is not intended to require any particular delivery or receipt of the provided item. Rather, the term "providing" is merely used to recite items that will be referred to in subsequent elements of the claim(s), for purposes of clarity and ease of readability.

The term "selective deposition" refers to an additive manufacturing technique where one or more layers of particles are fused to previously deposited layers utilizing heat and pressure over time where the particles fuse together to form a layer of the part and also fuse to the previously printed layer.

The term "electrostatography" refers to the formation and utilization of latent electrostatic charge patterns to form an image of a layer of a part, a support structure or both on a surface. Electrostatography includes, but is not limited to, electrophotography where optical energy is used to form the latent image, ionography where ions are used to form the latent image and/or electron beam imaging where electrons are used to form the latent image.

The term "semi-crystalline" refers to polymers that form crystalline structures upon cooling after being melted. Non-limiting examples of semi-crystalline materials include polyolefins such as polyethylene and polypropylene; polyesters, polyamides, such as, but not limited to, nylons, polysulfones such as polyethersulfone (PES) and ketones, such as, but not limited to, polyetheretherketone (PEEK), and polyetherketoneketone (PEKK).

Unless otherwise specified, temperatures referred to herein are based on atmospheric pressure (i.e. one atmosphere).

The terms "about" and "substantially" are used herein with respect to measurable values and ranges due to expected variations known to those skilled in the art (e.g., limitations and variabilities in measurements).

All references cited herein are incorporated by reference in their entireties.

Figure 1:
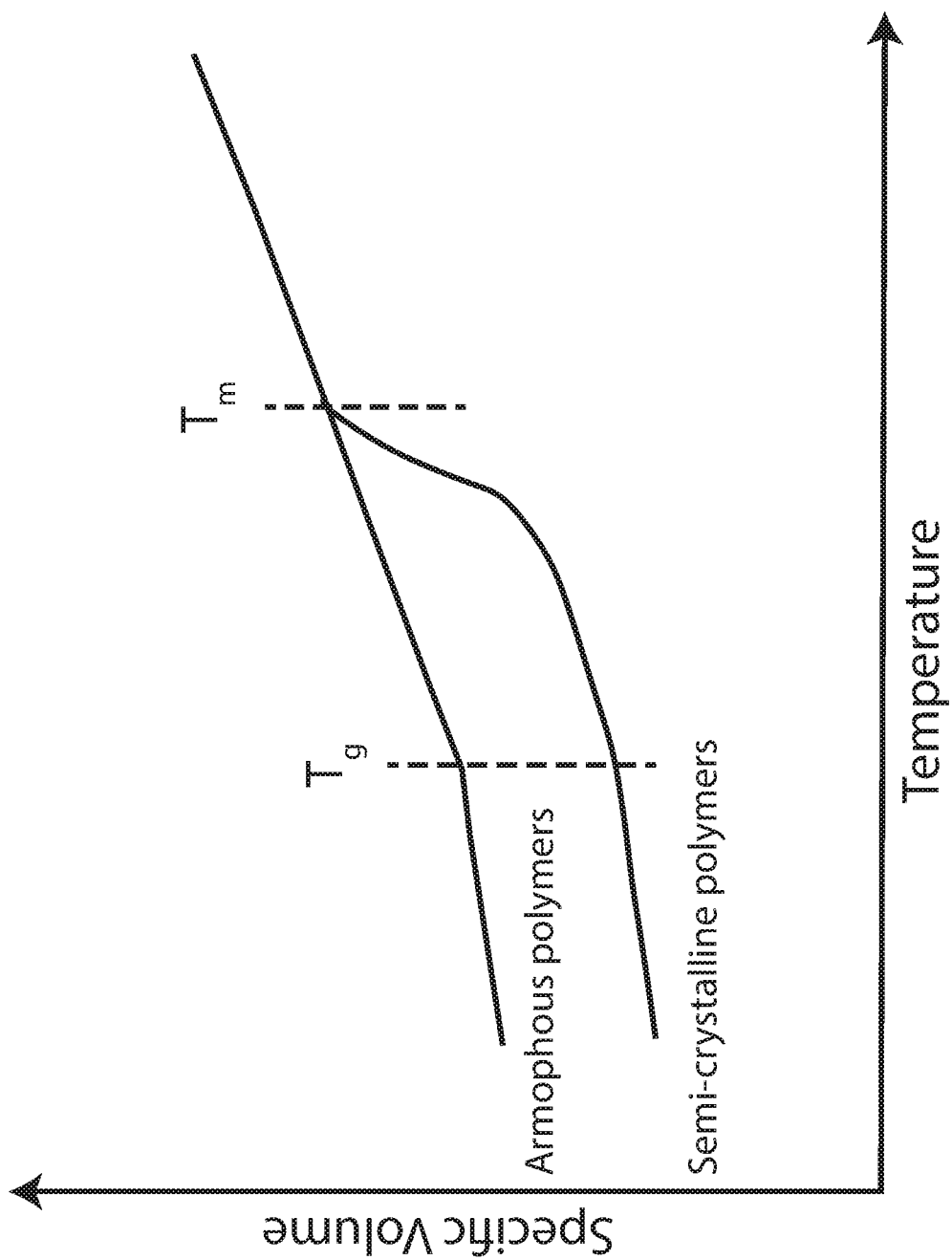
FIG. 1 is a graph of specific volume versus temperature for a typical amorphous polymer and a typical semi-crystalline polymer.

While the above-identified figures set forth one or more embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

The present disclosure is directed to selective deposition-based additive manufacturing systems for printing 3D parts with semi-crystalline materials or material feedstocks that have a semi-crystalline polymeric matrix, and methods of printing 3D parts with semi-crystalline materials or material feedstocks that have a semi-crystalline polymeric matrix using such systems. During a selective deposition 3D part additive manufacturing or printing operation, an electrostatography engine can develop each layer of the 3D part (and any associated support material) from a polymeric toners or powder-based materials using an electrostatographic process. The developed layers are then transferred to a transfer medium (e.g., a flexible, continuous belt), which conveys the layers to a transfusion assembly where those layers are transfused (e.g., transferred and fused using heat and pressure) to build a 3D part and support structures in a layer-by-layer manner.

Typically, amorphous polymeric materials have been used to print 3D parts because the physical properties of amorphous polymeric materials, specifically their densities, gradually change with temperature. In contrast, semi-crystalline polymeric materials generally have more abrupt changes in density near a melting temperature is reached, which causes the semi-crystalline material to mechanically distort in an additive manufacturing process. As the semi-crystalline material cools, crystalline structures are rapidly formed which causes rapid shrinkage. When attempting to print 3D parts, the shrinkage causes intra-layer curling and de-lamination between layers.

The glass transition temperature, $T_g$, is usually defined as a second order phase transition where the specific heat undergoes a step increase from lower to higher temperature. Generally, it is accompanied by a step change in the slope of the specific volume, as shown in FIG. 1. The melt temperature, $T_m$, is a first order phase transition where heat is released as the temperature is increased through $T_m$. There are generally specific volume changes in semicrystalline polymers near $T_m$, as shown in FIG. 1.

Semi-crystalline materials behave significantly differently than amorphous polymeric materials. Semi-crystalline materials typically have an amorphous domain and a crystalline domain. The amorphous domain behaves as mentioned above, and softens and flows after the glass transition temperature is reached, while the crystalline domain has abrupt changes in density.

As illustrated in FIG. 1, the slope of the line of the semi-crystalline domain is high proximate the melting temperature ($T_m$), which is indicative of a high thermal expansion coefficient. Parts made by additive manufacturing systems in this temperature range are therefore prone to curl.

Electrostatography-based additive manufacturing systems produce layers of material as substantially unheated sheets. The layers are moved from an imaging engine to a transfusion assembly where the part being printed can be preheated, the layer transfused to the prior printed layer and the heat can be removed in a sufficiently short amount of time. The heat can be rapidly removed from a semicrystalline part being printed, supercooling the transferred layer to an amorphous-like material in the short period of time, which prevents intra-layer curling and de-lamination between the layers such that the 3D part can be printed with semi-crystalline based materials. Once the part is printed, the entire part is allowed to crystallize in a controlled manner, similar to that of an injection molded part.

While the present disclosure can be utilized with any electrostatography-based additive manufacturing system, the present disclosure will be described in association in an electrophotography-based (EP) additive manufacturing system. However, the present disclosure is not limited to an EP based additive manufacturing system and can be utilized with any electrostatography-based additive manufacturing system.

Figure 2:
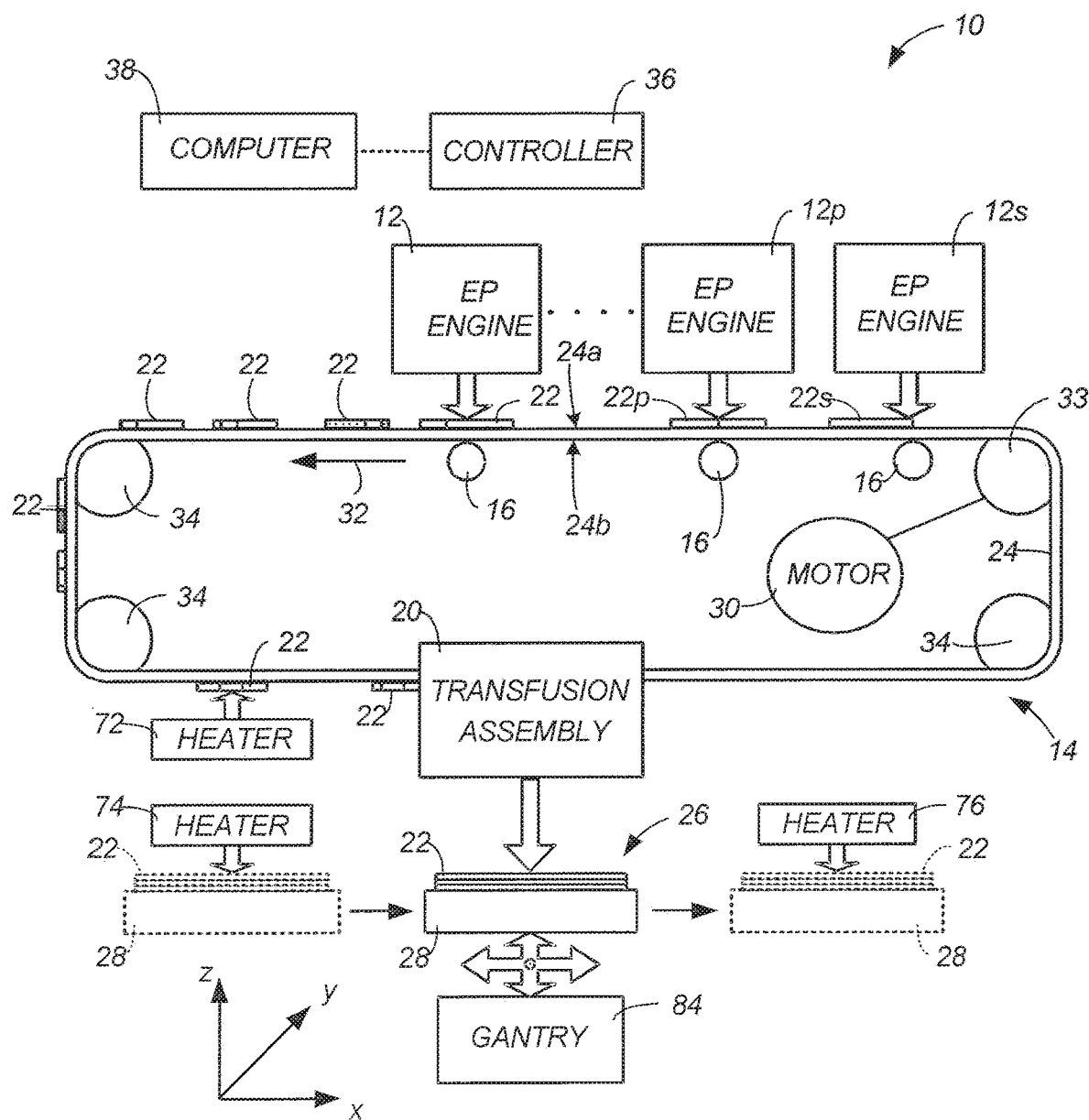
FIG. 2 is a simplified diagram of an example electrophotography-based additive manufacturing system for printing 3D parts and associated support structures, in accordance with embodiments of the present disclosure.

FIG. 2 is a simplified diagram of an example electrophotography-based additive manufacturing system 10 for printing 3D parts and associated support structures, in accordance with embodiments of the present disclosure. As shown in FIG. 1, system 10 includes one or more EP engines, generally referred to as 12, such as EP engines 12p and 12s, a transfer assembly 14, biasing mechanisms 16, and a transfusion assembly 20. Examples of suitable components and functional operations for system 10 include those disclosed in Hanson et al., U.S. Pat. Nos. 8,879,957 and 8,488,994, and in Comb et al., U.S. Patent Publication Nos. 2013/0186549 and 2013/0186558.

The EP engines 12p and 12s are imaging engines for respectively imaging or otherwise developing layers, generally referred to as 22, of the powder-based part and support materials, where the part and support materials are each preferably engineered for use with the particular architecture of the EP engine 12p or 12s. As discussed below, the developed layers 22 are transferred to a transfer medium 24 of the transfer assembly 14, which delivers the layers 22 to the transfusion assembly 20. The transfusion assembly 20 operates to build the 3D part 26, which may include support structures and other features, in a layer-by-layer manner by transfusing the layers 22 together on a build platform 28.

Figure 3:
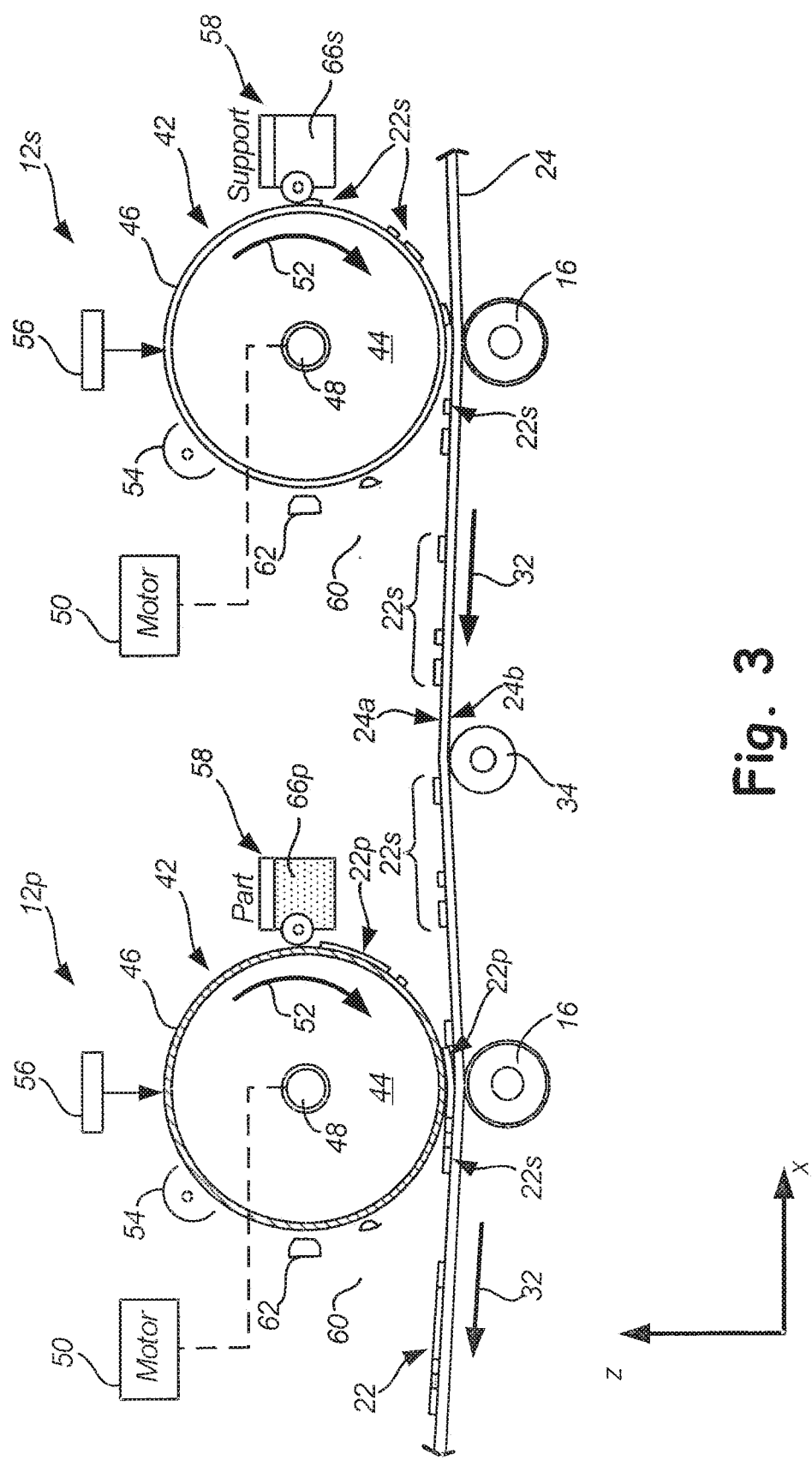
FIG. 3 is a schematic front view of a pair of example electrophotography (EP) engines of the system for developing layers of the part and support materials.

In some embodiments, the transfer medium 24 includes a belt, as shown in FIG. 3. Examples of suitable transfer belts for the transfer medium 24 include those disclosed in Comb et al., U.S. Patent Application Publication Nos. 2013/0186549 and 2013/0186558. In some embodiments, the belt 24 includes front surface 24a and rear surface 24b, where front surface 24a faces the EP engines 12, and the rear surface 24b is in contact with the biasing mechanisms 16.

In some embodiments, the transfer assembly 14 includes one or more drive mechanisms that include, for example, a motor 30 and a drive roller 33, or other suitable drive mechanism, and operate to drive the transfer medium or belt 24 in a feed direction 32. In some embodiments, the transfer assembly 14 includes idler rollers 34 that provide support for the belt 24. The example transfer assembly 14 illustrated in FIG. 3 is highly simplified and may take on other configurations. Additionally, the transfer assembly 14 may include additional components that are not shown in order to simplify the illustration, such as, for example, components for maintaining a desired tension in the belt 24, a belt cleaner for removing debris from the surface 24a that receives the layers 22, and other components.

The EP engine 12s develops layers of powder-based support material, and the EP engine 12p develops layers of powder-based part/build material. In some embodiments, the EP engine 12s is positioned upstream from the EP engine 12p relative to the feed direction 32, as shown in FIG. 2. In alternative embodiments, the arrangement of the EP engines 12p and 12s may be reversed such that the EP engine 12p is upstream from the EP engine 12s relative to the feed direction 32. In further alternative embodiments, system 10 may include three or more EP engines 12 for printing layers of additional materials.

System 10 also includes controller 36, which represents one or more processors that are configured to execute instructions, which may be stored locally in memory of the system 10 or in memory that is remote to the system 10, to control components of the system 10 to perform one or more functions described herein. In some embodiments, the controller 36 includes one or more control circuits, microprocessor-based engine control systems, and/or digitally-controlled raster imaging processor systems, and is configured to operate the components of system 10 in a synchronized manner based on printing instructions received from a host computer 38 or a remote location. In some embodiments, the host computer 38 includes one or more computer-based systems that are configured to communicate with controller 36 to provide the print instructions (and other operating information). For example, the host computer 38 may transfer information to the controller 36 that relates to the sliced layers of the 3D parts and support structures, thereby allowing the system 10 to print the 3D parts 26 and support structures in a layer-by-layer manner.

The components of system 10 may be retained by one or more frame structures (not shown for simplicity). Additionally, the components of system 10 may be retained within an enclosable housing (not shown for simplicity) that prevents components of the system 10 from being exposed to ambient light during operation.

FIG. 3 is a schematic front view of the EP engines 12s and 12p of the system 10, in accordance with example embodiments of the present disclosure. In the illustrated embodiment, the EP engines 12p and 12s may include the same components, such as a photoconductor drum 42 having a conductive drum body 44 and a photoconductive surface 46. The conductive drum body 44 is an electrically-conductive drum (e.g., fabricated from copper, aluminum, tin, or the like) that is configured to rotate around a shaft 48. The shaft 48 is correspondingly connected to a drive motor 50, which is configured to rotate the shaft 48 (and the photoconductor drum 42) in the direction of arrow 52 at a constant rate.

The photoconductive surface 46 is a thin film extending around the circumferential surface of the conductive drum body 44, and is preferably derived from one or more photoconductive materials, such as amorphous silicon, selenium, zinc oxide, organic materials, and the like. As discussed below, the surface 46 is configured to receive latent-charged images of the sliced layers of a 3D part or support structure (or negative images), and to attract charged particles of the part or support material to the charged or discharged image areas, thereby creating the layers of the 3D part or support structure.

As further shown, each of the example EP engines 12p and 12s also includes a charge inducer 54, an imager 56, a development station 58, a cleaning station 60, and a discharge device 62, each of which may be in signal communication with the controller 36. The charge inducer 54, the imager 56, the development station 58, the cleaning station 60, and the discharge device 62 accordingly define an image-forming assembly for the surface 46 while the drive motor 50 and the shaft 48 rotate the photoconductor drum 42 in the direction 52.

Each of the EP engines 12 uses the powder-based material (e.g., polymeric or thermoplastic toner), generally referred to herein by reference character 66, to develop or form the layers 22. In some embodiments, the image-forming assembly for the surface 46 of the EP engine 12s is used to form support layers 22s of powder-based support material 66s, where a supply of the support material 66s may be retained by the development station 58 (of the EP engine 12s) along with carrier particles. Similarly, the image-forming assembly for the surface 46 of the EP engine 12p is used to form part layers 22p of powder-based part material 66p, where a supply of the part material 66p may be retained by the development station 58 (of the EP engine 12p), generally along with carrier particles.

The charge inducer 54 is configured to generate a uniform electrostatic charge on the surface 46 as the surface 46 rotates in the direction 52 past the charge inducer 54. Suitable devices for the charge inducer 54 include corotrons, scorotrons, charging rollers, and other electrostatic charging devices.

Each imager 56 is a digitally-controlled, pixel-wise light exposure apparatus configured to selectively emit electromagnetic radiation toward the uniform electrostatic charge on the surface 46 as the surface 46 rotates in the direction 52 the past imager 56. The selective exposure of the electromagnetic radiation to the surface 46 is directed by the controller 36, and causes discrete pixel-wise locations of the electrostatic charge to be removed (i.e., discharged to ground), thereby forming latent image charge patterns on the surface 46.

Suitable devices for the imager 56 include scanning laser (e.g., gas or solid-state lasers) light sources, light emitting diode (LED) array exposure devices, and other exposure device conventionally used in 2D electrophotography systems. In alternative embodiments, suitable devices for the charge inducer 54 and the imager 56 include ion-deposition systems configured to selectively directly deposit charged ions or electrons to the surface 46 to form the latent image charge pattern. As such, as used herein, the term "electrophotography" includes ionography.

Each development station 58 is an electrostatic and magnetic development station or cartridge that retains the supply of the part material 66p or the support material 66s, along with carrier particles. The development stations 58 may function in a similar manner to single or dual component development systems and toner cartridges used in 2D electrophotography systems. For example, each development station 58 may include an enclosure for retaining the part material 66p or the support material 66s and carrier particles. When agitated, the carrier particles generate triboelectric charges to attract the powders of the part material 66p or the support material 66s, which charges the attracted powders to a desired sign and magnitude, as discussed below.

Each development station 58 may also include one or more devices for transferring the charged part or the support material 66p or 66s to the surface 46, such as conveyors, fur brushes, paddle wheels, rollers, and/or magnetic brushes. For instance, as the surface 46 (containing the latent charged image) rotates from the imager 56 to the development station 58 in the direction 52, the charged part material 66p or the support material 66s is attracted to the appropriately charged regions of the latent image on the surface 46, utilizing either charged area development or discharged area development (depending on the electrophotography mode being utilized). This creates successive layers 22p or 22s as the photoconductor drum 12 continues to rotate in the direction 52, where the successive layers 22p or 22s correspond to the successive sliced layers of the digital representation of the 3D part or support structure.

The successive layers 22p or 22s are then rotated with the surface 46 in the direction 52 to a transfer region in which layers 22p or 22s are successively transferred from the photoconductor drum 42 to the belt 24 or other transfer medium, as discussed below. While illustrated as a direct engagement between the photoconductor drum 42 and the belt 24, in some preferred embodiments, the EP engines 12p and 12s may also include intermediary transfer drums and/or belts, as discussed further below.

After a given layer 22p or 22s is transferred from the photoconductor drum 42 to the belt 24 (or an intermediary transfer drum or belt), the drive motor 50 and the shaft 48 continue to rotate the photoconductor drum 42 in the direction 52 such that the region of the surface 46 that previously held the layer 22p or 22s passes the cleaning station 60. The cleaning station 60 is a station configured to remove any residual, non-transferred portions of part or support material 66p or 66s. Suitable devices for the cleaning station 60 include blade cleaners, brush cleaners, electrostatic cleaners, vacuum-based cleaners, and combinations thereof.

After passing the cleaning station 60, the surface 46 continues to rotate in the direction 52 such that the cleaned regions of the surface 46 pass the discharge device 62 to remove any residual electrostatic charge on the surface 46, prior to starting the next cycle. Suitable devices for the discharge device 62 include optical systems, high-voltage alternating-current corotrons and/or scorotrons, one or more rotating dielectric rollers having conductive cores with applied high-voltage alternating-current, and combinations thereof.

The biasing mechanisms 16 are configured to induce electrical potentials through the belt 24 to electrostatically attract the layers 22p and 22s from the EP engines 12p and 12s to the belt 24. Because the layers 22p and 22s are each only a single layer increment in thickness at this point in the process, electrostatic attraction is suitable for transferring the layers 22p and 22s from the EP engines 12p and 12s to the belt 24.

The controller 36 preferably rotates the photoconductor drums 36 of the EP engines 12p and 12s at the same rotational rates that are synchronized with the line speed of the belt 24 and/or with any intermediary transfer drums or belts. This allows the system 10 to develop and transfer the layers 22p and 22s in coordination with each other from separate developer images. In particular, as shown, each part layer 22p may be transferred to the belt 24 with proper registration with each support layer 22s to produce a combined part and support material layer, which is generally designated as layer 22. As can be appreciated, some of the layers 22 transferred to the layer transfusion assembly 20 may only include support material 66s or may only include part material 66p, depending on the particular support structure and 3D part geometries and layer slicing.

In an alternative embodiment, the part layers 22p and the support layers 22s may optionally be developed and transferred along the belt 24 separately, such as with alternating layers 22p and 22s. These successive, alternating layers 22p and 22s may then be transferred to layer transfusion assembly 20, where they may be transfused separately to print or build the 3D part 26 and support structure.

Figure 4:
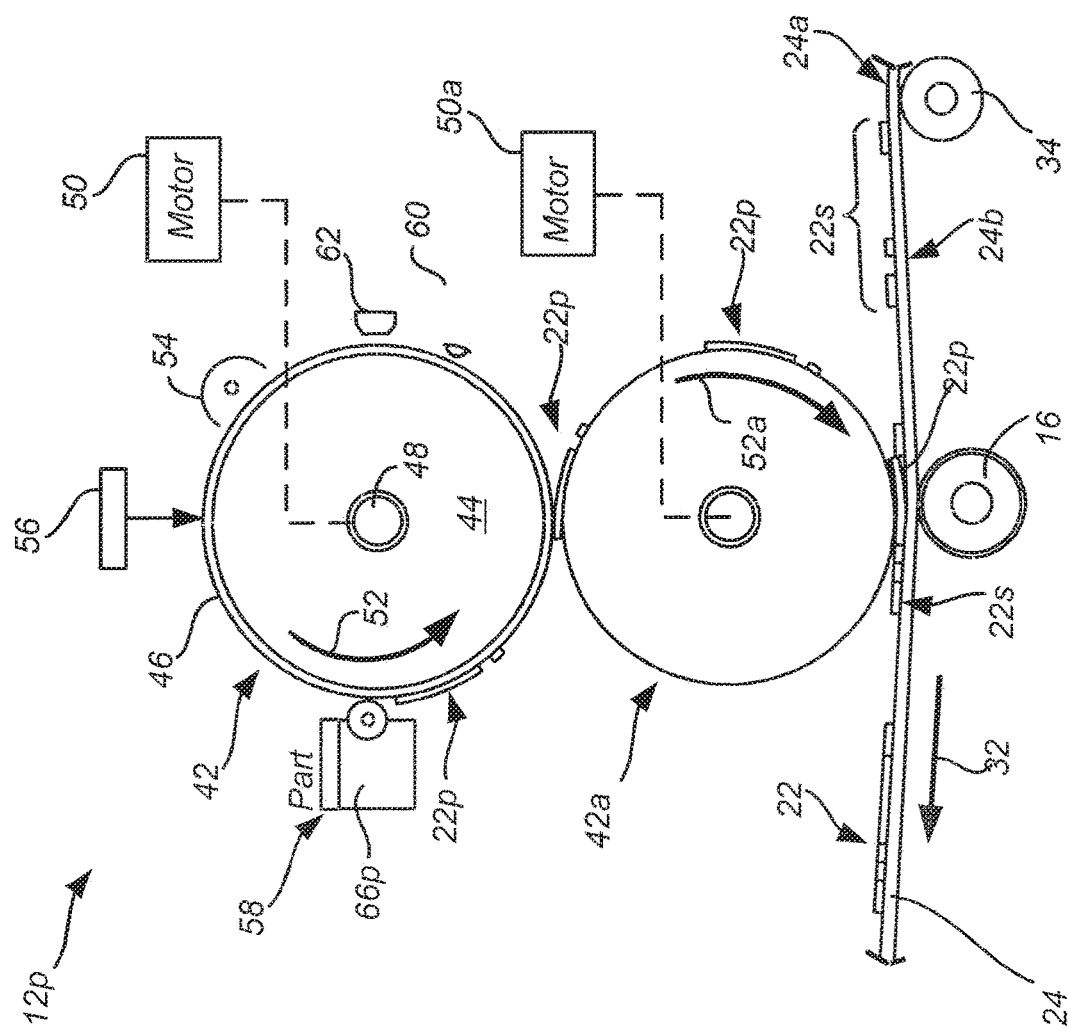
FIG. 4 is a schematic front view of an example electrophotography engine, which includes an intermediary drum or belt.

In a further alternative embodiment, one or both of the EP engines 12p and 12s may also include one or more intermediary transfer drums and/or belts between the photoconductor drum 42 and the belt or transfer medium 24. For example, as shown in FIG. 4, the EP engine 12p may also include an intermediary drum 42a that rotates in the direction 52a that opposes the direction 52, in which drum 42 is rotated, under the rotational power of motor 50a. The intermediary drum 42a engages with the photoconductor drum 42 to receive the developed layers 22p from the photoconductor drum 42, and then carries the received developed layers 22p and transfers them to the belt 24.

The EP engine 12s may include the same arrangement of an intermediary drum 42a for carrying the developed layers 22s from the photoconductor drum 42 to the belt 24. The use of such intermediary transfer drums or belts for the EP engines 12p and 12s can be beneficial for thermally isolating the photoconductor drum 42 from the belt 24, if desired.

Figure 5:
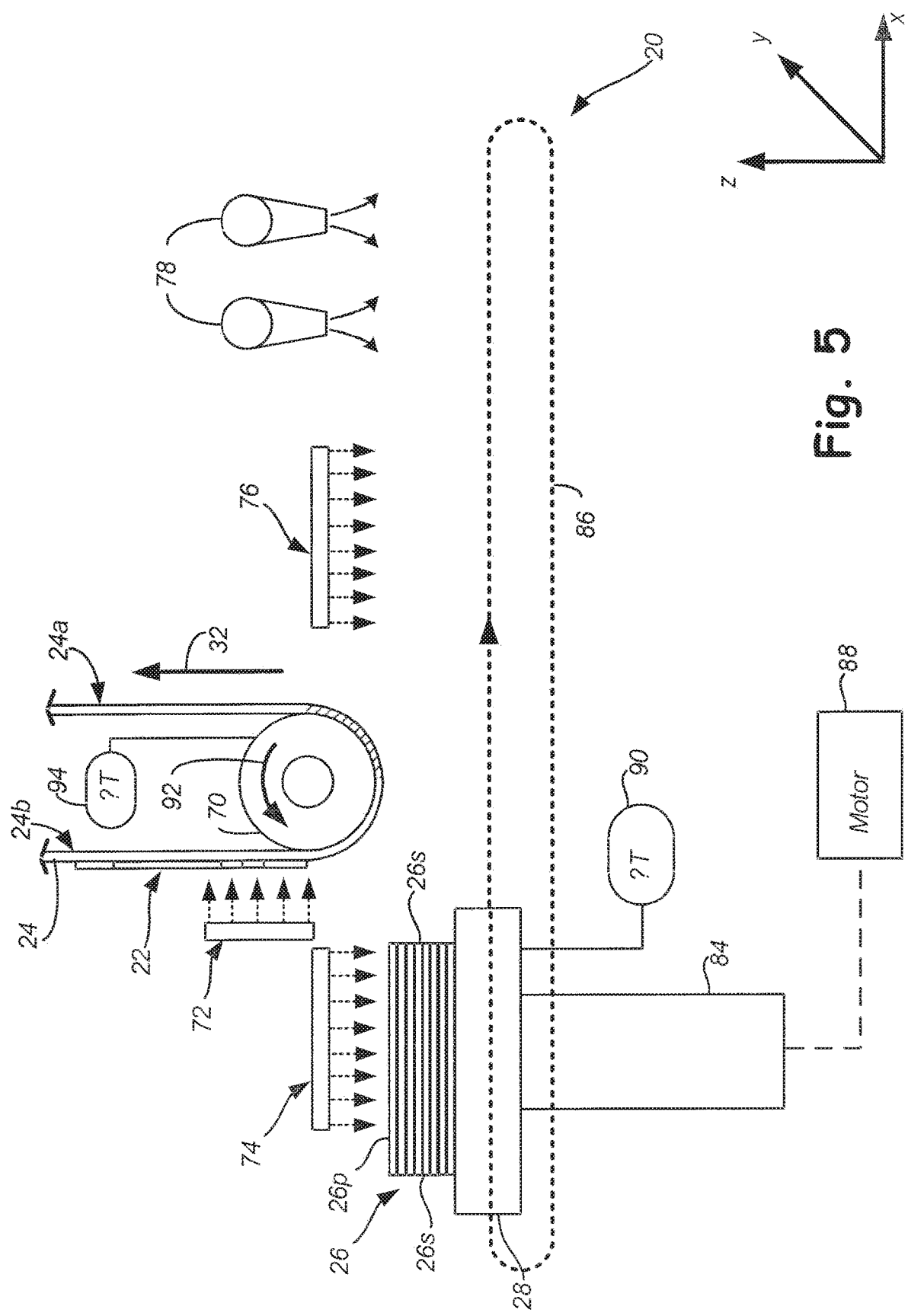
FIG. 5 is a schematic front view of an example transfusion assembly of the system for performing layer transfusion steps with the developed layers.

FIG. 5 illustrates a schematic view of the transfer assembly 20. As shown, the transfusion assembly 20 includes the build platform 28, a nip roller 70, pre-transfusion heaters 72 and 74, an optional post-transfusion heater 76, and air jets 78 (or other cooling units). The build platform 28 is a platform assembly or platen of system 10 that is configured to receive the heated combined layers 22 (or separate layers 22p and 22s) for printing the part 26, which includes a 3D part 26p formed of the part layers 22p, and support structure 26s formed of the support layers 22s, in a layer-by-layer manner. In some embodiments, the build platform 28 may include removable film substrates (not shown) for receiving the printed layers 22, where the removable film substrates may be restrained against build platform using any suitable technique (e.g., vacuum drawing).

The build platform 28 is supported by a gantry 84 or other suitable mechanism, which can be configured to move the build platform 28 along the z-axis and the x-axis (and, optionally, also the y-axis), as illustrated schematically in FIG. 2 (the y-axis being into and out of the page in FIG. 2, with the z-, x- and y-axes being mutually orthogonal, following the right-hand rule). The gantry 84 may produce cyclical movement patterns relative to the nip roller 70 and other components, as illustrated by broken line 86 in FIG. 5. The particular movement pattern of the gantry 84 can follow essentially any desired path suitable for a given application. The gantry 84 may be operated by a motor 88 based on commands from the controller 36, where the motor 88 may be an electrical motor, a hydraulic system, a pneumatic system, or the like. In one embodiment, the gantry 84 can included an integrated mechanism that precisely controls movement of the build platform 28 in the z- and x-axis directions (and optionally the y-axis direction). In alternate embodiments, the gantry 84 can include multiple, operatively-coupled mechanisms that each control movement of the build platform 28 in one or more directions, for instance, with a first mechanism that produces movement along both the z-axis and the x-axis and a second mechanism that produces movement along only the y-axis. The use of multiple mechanisms can allow the gantry 84 to have different movement resolution along different axes. Moreover, the use of multiple mechanisms can allow an additional mechanism to be added to an existing mechanism operable along fewer than three axes.

In the illustrated embodiment, the build platform 28 is heatable with heating element 90 (e.g., an electric heater). The heating element 90 is configured to heat and maintain the build platform 28 at an elevated temperature that is greater than room temperature (25° C.), such as at a desired average part temperature of 3D part 26p and/or support structure 26s, as discussed in Comb et al., U.S. Patent Application Publication Nos. 2013/0186549 and 2013/0186558. This allows the build platform 28 to assist in maintaining 3D part 26p and/or support structure 26s at this average part temperature.

The nip roller 70 is an example heatable element or heatable layer transfusion element, which is configured to rotate around a fixed axis with the movement of the belt 24. In particular, the nip roller 70 may roll against the rear surface 22s in the direction of arrow 92 while the belt 24 rotates in the feed direction 32. In the shown embodiment, the nip roller 70 is heatable with a heating element 94 (e.g., an electric heater). The heating element 94 is configured to heat and maintain nip roller 70 at an elevated temperature that is greater than room temperature (25° C.), such as at a desired transfer temperature for the layers 22.

The pre-transfusion heater 72 includes one or more heating devices (e.g., an infrared heater and/or a heated air jet) that are configured to heat the layers 22 on the belt 24 to a temperature near an intended transfer temperature of the layer 22, such as at least a fusion temperature of the part material 66p and the support material 66s, prior to reaching nip roller 70. Each layer 22 desirably passes by (or through) the heater 72 for a sufficient residence time to heat the layer 22 to the intended transfer temperature. The pre-transfusion heater 74 may function in the same manner as the heater 72, and heats the top surfaces of the 3D part 26p and support structure 26s on the build platform 28 to an elevated temperature, such as at the same transfer temperature as the heated layers 22 (or other suitable elevated temperature).

As mentioned above, the support material 66s of the present disclosure used to form the support layers 22s and the support structure 26s, preferably has a melt rheology that is similar to or substantially the same as the melt rheology of the part material 66p of the present disclosure used to form the part layers 22p and the 3D part 26p. This allows the part and support materials 66p and 66s of the layers 22p and 22s to be heated together with the heater 72 to generally the same transfer temperature, and also allows the part and support materials 66p and 66s at the top surfaces of the 3D part 26p and support structure 26s to be heated together with heater 74 to generally the same temperature. Thus, the part layers 22p and the support layers 22s may be transfused together to the top surfaces of the 3D part 26p and the support structure 26s in a single transfusion step as the combined layer 22.

Optional post-transfusion heater 76 is located downstream from nip roller 70 and upstream from air jets 78, and is configured to heat the transfused layers 22 to an elevated temperature. Again, the close melt rheologies of the part and support materials 66p and 66s allow the post-transfusion heater 76 to post-heat the top surfaces of 3D part 26p and support structure 26s together in a single post-fuse step.

As mentioned above, in some embodiments, prior to building the part 26 on the build platform 28, the build platform 28 and the nip roller 70 may be heated to their desired temperatures. For example, the build platform 28 may be heated to the average part temperature of 3D part 26p and support structure 26s (due to the close melt rheologies of the part and support materials). In comparison, the nip roller 70 may be heated to a desired transfer temperature for the layers 22 (also due to the close melt rheologies of the part and support materials).

During the printing or transferring operation, the belt 24 carries a layer 22 past the heater 72, which may heat the layer 22 and the associated region of the belt 24 to the transfer temperature. Suitable transfer temperatures for the part and support materials 66p and 66s of the present disclosure include temperatures that exceed the glass transition temperature of the part and support materials 66p and 66s, where the layer 22 is softened but not significantly above Tm.

As further shown in FIG. 5, during operation, the gantry 84 may move the build platform 28 (with 3D part 26p and support structure 26s) in a reciprocating pattern 86. In particular, the gantry 84 may move the build platform 28 along the x-axis below, along, or through the heater 74. The heater 74 heats the top surfaces of 3D part 26p and support structure 26s to an elevated temperature, such as the transfer temperatures of the part and support materials. As discussed in Comb et al., U.S. Patent Application Publication Nos. 2013/0186549 and 2013/0186558, the heaters 72 and 74 may heat the layers 22 and the top surfaces of 3D part 26p and support structure 26s to about the same temperatures to provide a consistent transfusion interface temperature. Alternatively, the heaters 72 and 74 may heat layers 22 and the top surfaces of 3D part 26p and support structure 26s to different temperatures to attain a desired transfusion interface temperature.

The continued rotation of the belt 24 and the movement of the build platform 28 align the heated layer 22 with the heated top surfaces of 3D part 26p and support structure 26s with proper registration along the x-axis. The gantry 84 may continue to move the build platform 28 along the x-axis, at a rate that is synchronized with the rotational rate of the belt 24 in the feed direction 32 (i.e., the same directions and speed). This causes the rear surface 24b of the belt 24 to rotate around the nip roller 70 to nip the belt 24. This presses the heated layer 22 between the heated top surfaces of 3D part 26p and support structure 26s at the location of the nip roller 70, which at least partially transfuses the heated layer 22 to the top layers of 3D part 26p and support structure 26s.

As the transfused layer 22 passes the nip of the nip roller 70, the belt 24 wraps around the nip roller 70 to separate and disengage from the build platform 28. This assists in releasing the transfused layer 22 from the belt 24, allowing the transfused layer 22 to remain adhered to 3D part 26p and support structure 26s. Maintaining the transfusion interface temperature at a transfer temperature that is higher than its glass transition temperature, but lower than its fusion temperature, allows the heated layer 22 to be hot enough to adhere to the 3D part 26p and support structure 26s, while also being cool enough to readily release from the belt 24.

After release, the gantry 84 continues to move the build platform 28 along the x-axis to an optional post-transfusion heater 76. At post-transfusion heater 76, the top-most layers of 3D part 26p and the support structure 26s (including the transfused layer 22) may then be heated.

Additionally, as the gantry 84 continues to move the build platform 28 along the x-axis past the post-transfusion heater 76 to the cooler 78, the cooler 78 removes heat from the top layers of 3D part 26p and support structure 26s. This actively cools the transfused layer 22 down to the average part temperature, as discussed in Comb et al., U.S. Patent Application Publication Nos. 2013/0186549 and 2013/0186558.

To assist in keeping the 3D part 26p and support structure 26s at the average part temperature, in some preferred embodiments, the heater 74 and/or the heater 76 may operate to heat only the top-most layers of 3D part 26p and support structure 26s. For example, in embodiments in which heaters 72, 74, and 76 are configured to emit infrared radiation, the 3D part 26p and support structure 26s may include heat absorbers and/or other colorants configured to restrict penetration of the infrared wavelengths to within the top-most layers. Alternatively, the heaters 72, 74, and 76 may be configured to blow heated air across the top surfaces of 3D part 26p and support structure 26s. In either case, limiting the thermal penetration into 3D part 26p and support structure 26s allows the top-most layers to be sufficiently transfused, while also reducing the amount of cooling required to keep 3D part 26p and support structure 26s at the average part temperature.

The gantry 84 may then actuate the build platform 28 downward, and move the build platform 28 back along the x-axis to a starting position along the x-axis, following the reciprocating rectangular pattern 86. The build platform 28 desirably reaches the starting position for proper registration with the next layer 22. In some embodiments, the gantry 84 may also actuate the build platform 28 and 3D part 26p/support structure 26s upward for proper registration with the next layer 22. The same process may then be repeated for each remaining layer 22 of 3D part 26p and support structure 26s.

After the transfusion operation is completed, the resulting 3D part 26p and support structure 26s may be removed from system 10 and undergo one or more post-printing operations. For example, support structure 26s may be sacrificially removed from 3D part 26p using an aqueous-based solution, such as an aqueous alkali solution. Under this technique, support structure 26s may at least partially dissolve in the solution, separating it from 3D part 26p in a hands-free manner.

In comparison, part materials are chemically resistant to aqueous alkali solutions. This allows the use of an aqueous alkali solution to be employed for removing the sacrificial support structure 26s without degrading the shape or quality of 3D part 26p. Examples of suitable systems and techniques for removing support structure 26s in this manner include those disclosed in Swanson et al., U.S. Pat. No. 8,459,280; Hopkins et al., U.S. Pat. No. 8,246,888; and Dunn et al., U.S. Patent Application Publication No. 2011/0186081; each of which are incorporated by reference to the extent that they do not conflict with the present disclosure.

Furthermore, after support structure 26s is removed, 3D part 26p may undergo one or more additional post-printing processes, such as surface treatment processes. Examples of suitable surface treatment processes include those disclosed in Priedeman et al., U.S. Pat. No. 8,123,999; and in Zinniel, U.S. Pat. No. 8,765,045.

FIGS. 2-5 disclose an EP additive manufacturing system that can be utilized to print 3D parts with amorphous polymeric materials that utilizes the single nip roller 70 with a typical transfusion pressure ranging between 20 psi and 80 psi because amorphous polymeric materials have a relatively high storage modulus proximate the glass transition temperature. For example, Acrylonitrile Butadiene Styrene (ABS) has a storage modulus of about 145 psi proximate the glass transition temperature which allows for a transfusion pressure between the nip roller 70 and the part being printed to be about 80 psi.

In contrast to amorphous polymeric materials, semi-crystalline part materials remain solid until melted. The storage modulus above $T_g$ but $T_m$ of typical engineering grade semi-crystalline material is about 7,250 psi.

The present application discloses a transfusion assembly that transfuses the layer in at a pressure compatible with semi-crystalline materials. After the transfer of the layer to the partially printed 3D part, the layer and the part are rapidly heated to bond the layer to top surface of the partially printed 3D part. The partially printed 3D part is then rapidly cooled to a temperature to minimize the formation of crystalline structures. The transfusion assembly of the present disclosure cools the semi-crystalline polymer quickly enough to prevent complete crystallization, and therefore cause the semi-crystalline material to have similar volumetric properties to that of an amorphous polymer, where rapid shrinking is prevented as the temperature is reduced. However, the rate of cooling can be controlled to obtain a desired crystallinity within the material, based upon the physical properties of the semi-crystalline material.

After the part has been printed and the support material is optionally removed, the part can be subjected to additional processing, such as a post build heating process. The post build process, such as heating, allows the entire part to crystallize in a controlled manner, similar to that of an injection molded part.

Although the present disclosure has been described with reference to preferred embodiments, workers skilled in the art will recognize that changes may be made in form and detail without departing from the spirit and scope of the disclosure.

The invention claimed is:

1. A selective deposition-based additive manufacturing system capable of building a three-dimensional (3D) part utilizing a semi-crystalline polymeric material, the system comprising:
at least one electrostatographic engine configured to develop one or more layers including particles of semi-crystalline polymeric material corresponding to one or more slices of a 3D model of a 3D part or their corresponding supports;
a transfer medium configured to receive the one or more layers of particles of the semi-crystalline polymeric material on a front side from the at least one electrostatographic engine and to move the one or more layers away from the electrostatographic engine;
a platen configured to carry the 3D part or support being printed;
a gantry coupled to the platen and configured to move the platen into registration with the one or more layers;
a heater configured to heat a top surface of the 3D part being printed to a transfuse temperature;
a layer transfer assembly comprising:
a roller contacting a back side of the transfer medium; and
a driver configured to cause the layer to transfer from the front side of the transfer medium to the heated top surface of the part; and
a cooler configured to cool the heated semi-crystalline polymeric material at a rate of at least 20° C. per second such that the semi-crystalline material is in a super-cooled state wherein the semi-crystalline polymeric material does not completely initially crystallize.

2. The system of claim 1, wherein the cooler is configured to cool the heated semi-crystalline polymeric material at a rate of at least 30° C. per second.

3. The system of claim 1, wherein the cooler comprises an air tunnel that shears cooling air across the top surface of the 3D part as the material cools to the super-cooled state.

4. The system of claim 1, wherein the cooler comprises an air tunnel or an air knife.

5. The system of claim 1, wherein the transfer medium comprises a continuous belt.

6. A method of printing a 3D part in a layer-wise manner with a semi-crystalline polymeric material utilizing a selective-deposition-based additive manufacturing system:
developing a first partial layer of semi-crystalline polymeric material using at least one electrostatotographic engine;
conveying the first partial layer from the at least one electrostatographic engine to a transfusion assembly with a transfer medium;
moving a platen carrying a 3D part being printed with a gantry to a location upstream from the transfusion assembly;
heating a top layer of the 3D part to a transfusion temperature;
registering the layer with the 3D part;
moving the 3D part and the layer through a transfusion assemble to thermally transfer the layer to the top surface of the 3D part while applying a pressure to a back surface of the transfer medium;
cooling the transfused layer to a temperature below a cold crystallization temperature at a rate of at least 20° C. per second such that the semi-crystalline material is super-cooled; and
repeating the above steps until the 3D part is printed.

7. The method of claim 6, wherein the cooling step comprises cooling the heated layer to super-cool the semi-crystalline material at a rate of at least 30° C. per second.

8. The method of claim 6, wherein the cooling step allows for less than 50% of full crystallization.

9. The method of claim 6, wherein the cooling step allows for less than 30% of full crystallization.

10. The method of claim 6, wherein the applying pressure step comprises applying between about 0.5 psi and about 200 psi to the back surface of the transfer medium.

11. The method of claim 6, and further comprising:
subjecting the printed part to one or more post build processes to increase a volume percent crystallinity in the printed part.

12. The method of claim 6, and further comprising:
developing a second partial layer of a second polymeric material using a second electrostatographic engine;
depositing the second partial layer onto the transfer medium with the first partial layer to form the first layer; and
conveying the first layer from the at least one electrostatographic engine to a transfusion assembly with a transfer medium.

13. The method of claim 12, wherein the second polymeric material is semi-crystalline.

14. The method of claim 12, wherein the second polymeric material is amorphous.

15. The method of claim 6, wherein the cooling the part comprises varying cooling rate to adjust the initial crystallinity of the part being printed.

16. The method of claim 6, wherein conveying the first partial layer comprises utilizing a continuous belt.

* * * * *